United States Patent
Smith et al.

(10) Patent No.: US 7,375,334 B2
(45) Date of Patent: May 20, 2008

(54) APPARATUS AND METHOD FOR OSL-BASED, REMOTE RADIATION MONITORING AND SPECTROMETRY

(75) Inventors: Leon Eric Smith, Richland, WA (US); Steven D. Miller, Richland, WA (US); Theodore W. Bowyer, Oakton, VA (US)

(73) Assignee: Battelle Memorial Institute, Richland, WA (US)

( * ) Notice: Subject to any disclaimer, the term of this patent is extended or adjusted under 35 U.S.C. 154(b) by 464 days.

(21) Appl. No.: 10/931,411

(22) Filed: Aug. 31, 2004

(65) Prior Publication Data

US 2006/0043299 A1    Mar. 2, 2006

(51) Int. Cl.
*G01J 3/00*    (2006.01)
(52) U.S. Cl. .............................. 250/339.07; 250/358.1; 250/483.1; 250/484.4
(58) Field of Classification Search ............ 250/339.07, 250/358.1, 459.1, 370.04, 374, 483.1, 484.2, 250/484.3, 484.4, 484.5
See application file for complete search history.

(56) References Cited

U.S. PATENT DOCUMENTS

| | | | |
|---|---|---|---|
| 5,892,234 A * | 4/1999 | McKeever et al. | 250/459.1 |
| 6,738,025 B2 | 5/2004 | Carrender et al. | |
| 6,745,008 B1 | 6/2004 | Gilbert et al. | |
| 7,009,181 B1 * | 3/2006 | Miller et al. | 250/358.1 |
| 7,067,824 B2 * | 6/2006 | Muller et al. | 250/458.1 |
| 2002/0149468 A1 | 10/2002 | Carrender et al. | |
| 2002/0149484 A1 | 10/2002 | Carrender et al. | |
| 2002/0158752 A1 | 10/2002 | Gilbert et al. | |
| 2004/0066278 A1 | 4/2004 | Hughes et al. | |
| 2004/0066279 A1 | 4/2004 | Pratt et al. | |
| 2004/0066280 A1 | 4/2004 | Pratt et al. | |
| 2004/0066281 A1 | 4/2004 | Hughes et al. | |
| 2004/0066752 A1 | 4/2004 | Hughes et al. | |
| 2004/0067764 A1 | 4/2004 | Pratt et al. | |
| 2004/0070500 A1 | 4/2004 | Pratt et al. | |

(Continued)

OTHER PUBLICATIONS

Lars Botter-Jensen "Development of Optically Stimulated Luminescence Techniques using Natural Minerals and Ceramics, and their Application to Retrospective Dosimetry", Riso National Laboratory, Roskilde, Sep. 2000.*

(Continued)

*Primary Examiner*—David P. Porta
*Assistant Examiner*—Mark R Gaworecki
(74) *Attorney, Agent, or Firm*—Allan C. Tuan

(57) ABSTRACT

Compact, OSL-based devices for long-term, unattended radiation detection and spectroscopy are provided. In addition, a method for extracting spectroscopic information from these devices is taught. The devices can comprise OSL pixels and at least one radiation filter surrounding at least a portion of the OSL pixels. The filter can modulate an incident radiation flux. The devices can further comprise a light source and a detector, both proximally located to the OSL pixels, as well as a power source and a wireless communication device, each operably connected to the light source and the detector. Power consumption of the device ranges from ultra-low to zero. The OSL pixels can retain data regarding incident radiation events as trapped charges. The data can be extracted wirelessly or manually. The method for extracting spectroscopic data comprises optically stimulating the exposed OSL pixels, detecting a read-out luminescence, and reconstructing an incident-energy spectrum from the luminescence.

79 Claims, 5 Drawing Sheets

U.S. PATENT DOCUMENTS

2004/0198233 A1    10/2004    Pratt et al.

OTHER PUBLICATIONS

Low-Resolution Imaging Using Optically Stimulated Luminescence, Information Release Form, Jan. 5, 2000, pp. 1-2.

Miller, et al., Optimized Readout System For Cooled Optically Stimulated Luminescence, Radiation Effects and Defects in Solics, 1991, vols. 119-121, pp. 15-20.

Miller, et al. Optical Annealing of CaF2:Mn for Cooled Optically Stimulated Luminescence,Radiation Protection Dosimetry, 1989, vol. 29 No. 3, pp. 195-198.

Miller, et al. High Dose Dosimetry Using Optically Stimulated Luminescence, Radiation Protection Dosimetry, 1996, vol. 66 Nos. 1-4, pp. 201-204.

Miller, et al. Cooled Optical Luminescence Dosimetry in Plastic Matrices, Radiation Protection Dosimetry, 1996, vol. 66 Nos. 1-4, pp. 89-93.

Miller, et al. Long-Term Fading Study of the Cooled Optically Stimulated Luminescence in CaF2:Mn, Radiation Protection Dosimetry, 1991, vol. 37 No. 4, pp. 275-277.

Miller, et al. Laser-Induced Optically Stimulated M Centre Luminescence in LIF, Radiation Protection Dosimetry, 1990, vol. 33 No. 1/4, pp. 59-62.

Eschbach, et al. A Gamma/Neutron Discriminating, Cooled,Optically Stimulated Luminescence (COSL) Dosemeter, Radiation Protection Dosimetry, 1993, vol. 47 Nos. 1/4, pp. 289-292.

McDonald et al. Optical Readout Method for Solid State Dosemeters, Radiation Protection Dosimetry, 1986, vol. 17, pp. 329-331.

Gibson,J.A.B.,(Book Reviews) Neptunium: Radiation Protection Guidlines, Radiation Protection Dosimetry, 1989, vol. 25 No. 3, pp. 71-72.

McKeever,Stephen, W.S., Optically Stimulated Luminescence Dosimetry, Nucl. Instr. and Meth. in Phys. Elsevier, 2001, B 184 pp. 29-54.

Botter-Jensen et al., Optically Stimulated Luminescence Dosimetry, Elsevier, 2003, pp. 1-345.

* cited by examiner

APPARATUS AND METHOD FOR OSL-BASED, REMOTE RADIATION MONITORING AND SPECTROMETRY

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

FIELD OF USE

The present invention generally relates to the field of zero- or low-power, remote radiation detection, and more particularly, to OSL-based radiation sensors and spectrometers and a method for extracting spectroscopic information from said spectrometer.

BACKGROUND

Commercially-available devices for unattended gamma-ray detection and spectrometry commonly have relatively high power requirements and contain expensive components. The high power consumption and cost renders most of the commercially-available, gamma-ray sensors and spectrometers unsuitable for long-term, unattended radiation detection and spectrometry. For example, typical sensors or spectrometers utilizing scintillators or room-temperature semiconductors as detectors must constantly draw power to record the energy of each incident event since the pulse processing electronics in most of these detectors must be "always on." Furthermore, the components in these sensors can be prohibitively expensive for one-time use and/or large-scale deployment in most, if not all, applications.

While OSL materials have been used in environmental radiation dosimetry for years, and have recently gained widespread use in personnel dosimetry, in the aforementioned dosimetry modes, OSL cannot provide spectroscopy information nor would it serve as an effective, long-term, remote radiation sensor. Thus, a need for zero-power to ultra-low-power, OSL-based sensors and spectrometers for long-term, unattended radiation monitoring exists.

SUMMARY

In view of the foregoing and other problems, disadvantages, and drawbacks of traditional compact, radiation detection technologies, the present invention has been devised. The invention encompasses an apparatus for and a method of gamma-ray and neutron detection and spectroscopy. One embodiment of the apparatus encompasses a compact sensor comprising an OSL pixel, a light source and a luminescence detector, both proximally located to the OSL pixel. A power source electrically connects to the light source and the luminescence detector, while a wireless communication device operably connects to the light source, the luminescence detector, and the power source. Another version of the apparatus encompasses a compact spectrometer comprising a plurality of OSL pixels and at least one radiation filter surrounding at least a portion of the OSL pixels for modulating a flux of incident radiation. The compact spectrometer can acquire spectroscopic information regarding the incident radiation flux.

The invention also encompasses a method for acquiring spectroscopic information about the incident radiation, which can comprise gamma-rays and/or neutrons. For a compact spectrometer that has been exposed to an incident flux of radiation, the method comprises the steps of optically stimulating the plurality of OSL pixels, thereby resulting in a readout luminescence of deposited energy values, and then detecting the readout luminescence to obtain a readout signal. An incident-energy spectrum can then be reconstructed from the readout signal.

It is an object of the present invention to provide compact, zero- to ultra-low-power sensors and spectrometers capable of long-term, unattended radiation monitoring.

It is another object to provide effective and economical sensors and spectrometers for large-scale deployment in a variety of operational environments.

It is yet another object to develop sensors and spectrometers for instrumented containers.

A further object is to provide the capability to use pulsed light sources for interrogation of the OSL pixels in the sensors.

Another object of the present invention is to further expand the applicability of OSL materials, especially in applications where zero or ultra-low power consumption is advantageous or required.

DETAILED DESCRIPTION

Many of the shortcomings of commercially-available devices could be overcome using a radiation detection and/or spectrometry device based on optically stimulated luminescence (OSL) materials. OSL materials constitute an integrating detector technology and are capable of recording total deposited energy during a measurement period. An enabling mechanism can be the creation of trapped charge carriers in the material by the ionizing radiation. Depending on the particular OSL material, these trapped charge carriers can have lifetimes measurable on geologic time scales. OSL materials and dosimetry are discussed in detail in "Optically Stimulated Luminescence Dosimetry" written by Lars Botter-Jensen, S. W. S. McKeever, and A. G. Wintle (Elsevier, 2003), which detailed discussions are incorporated herein by reference.

Figure 1:
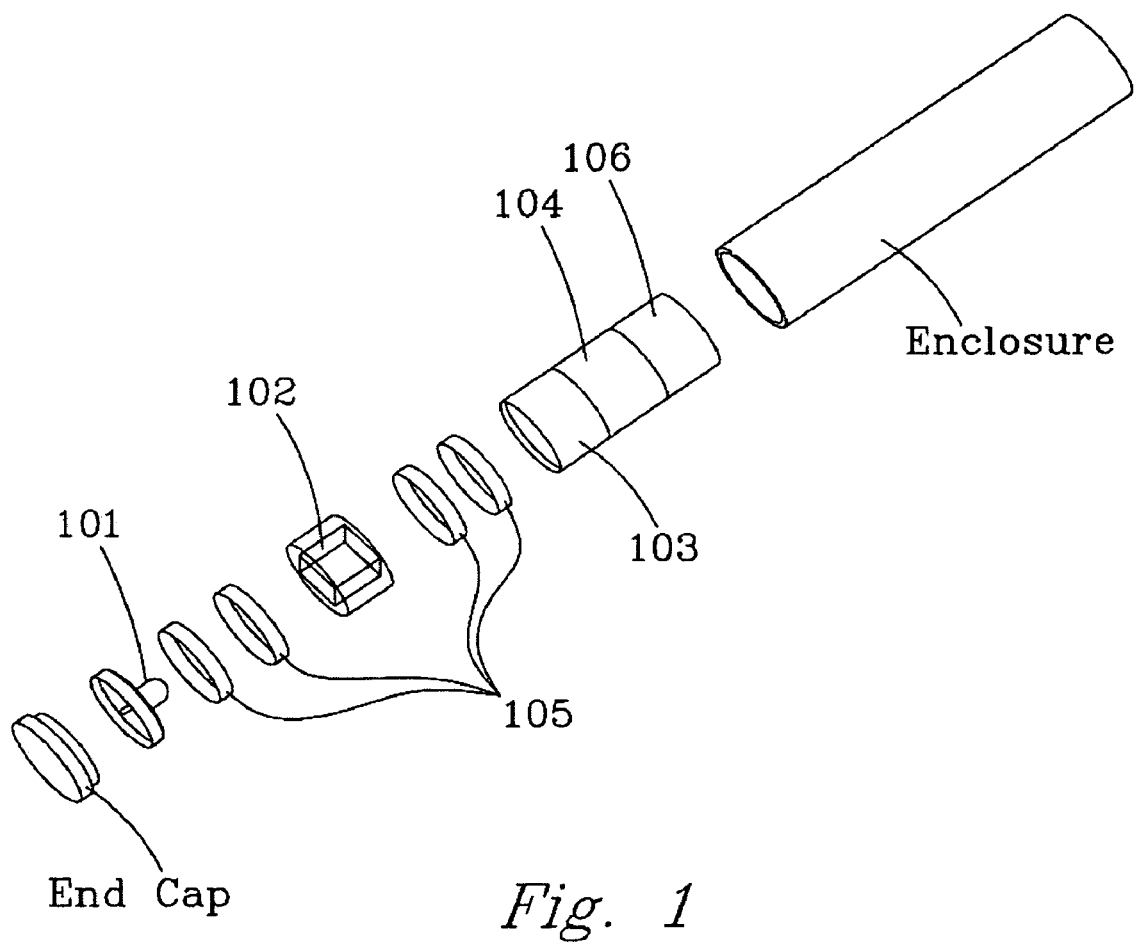
FIG. 1 is a schematic diagram showing an assembly drawing of an OSL-based, compact, radiation sensor.

The present invention is directed to long-term and/or unattended radiation monitoring using OSL-based sensors and spectrometers. One version of the invention encompasses a compact sensor comprising an OSL pixel, a light source, a luminescence detector, a power source, and a wireless communication device. Referring to FIG. 1, the light source 101 interrogates the OSL pixel 102 by optically exciting the OSL material at a first wavelength while the luminescence detector 103 converts light emitted at a second wavelength into a readout signal. Accordingly, both the light source 101 and the luminescence detector 103 can be proximally located to the OSL pixel and connected electrically to the power source 104. As used herein, proximally located can refer to the position of the light source and the luminescence detector relative to the OSL pixel, such that the OSL pixel can be exposed to light emitted from the light source and the detector can be exposed to light emitted by the OSL pixel. The light source 101, luminescence detector 103, and OSL pixel 102 need not be coaxial, but should not be positioned such that exposure of the OSL pixel or the detector to light from the light source or the OSL pixel, respectively, is prevented. Furthermore, optical elements 105 can be used to tune and direct the light delivered to both the OSL pixel 102 and the luminescence detector 103. Such elements can be placed in an optical path between the excitation light source and the OSL pixel as well as between the OSL pixel and the luminescence detector, and can include among other things, lenses, filters, prisms, gratings, mirrors, and apertures. As will be appreciated by one skilled in the art, the distance between the light source and the OSL pixel and between the OSL pixel and the detector can affect the intensity of the exposure. Larger distances may require longer exposure times and/or more sensitive OSL materials and detectors. The wireless communication device 106 imparts remote-readout capability and power-consumption control as described below. The wireless communication device can operably connect to the light source 101, the luminescence detector 103 and the power source 104. An enclosure can contain the above-mentioned components.

The OSL pixel can comprise a number of OSL materials including, but not limited to $Al_2O_3$, doped $Al_2O_3$, Pb-loaded $Al_2O_3$, BaFBr, and doped BaFBr, as well as other storage phosphors. The OSL materials can also be mixed with high-Z materials to make composites such as the Pb-loaded $Al_2O_3$. Examples of doped $Al_2O_3$ and BaFBr include $Al_2O_3$:C and BaFBr:Eu, respectively. More broadly, the OSL pixel can comprise OSL materials having decay constants less than approximately 100 msec. As used herein, "decay constant" refers to the time for the luminescence intensity to decrease to a value of $(1/e) I_p$, where $I_p$ is the peak intensity. The pixels can comprise a variety of shapes, for example, planar, cylindrical, spherical, and combinations thereof. Cylindrical and spherical pixels can be advantageous because the attenuation length can have a relatively reduced angular dependence.

The compact sensor can further comprise a radiation filter surrounding the OSL material. The radiation filter can serve to isolate particular energy ranges of interest for detection and can comprise an attenuating material such as metals, alloys, ceramics, glasses, polymers, and combinations thereof. For neutron detection, the sensor can further comprise a neutron converting material that surrounds the OSL pixel. The neutron converting material can comprise $^{10}B$, $^6Li$, Gd, Sm, or combinations thereof.

Figure 2A:
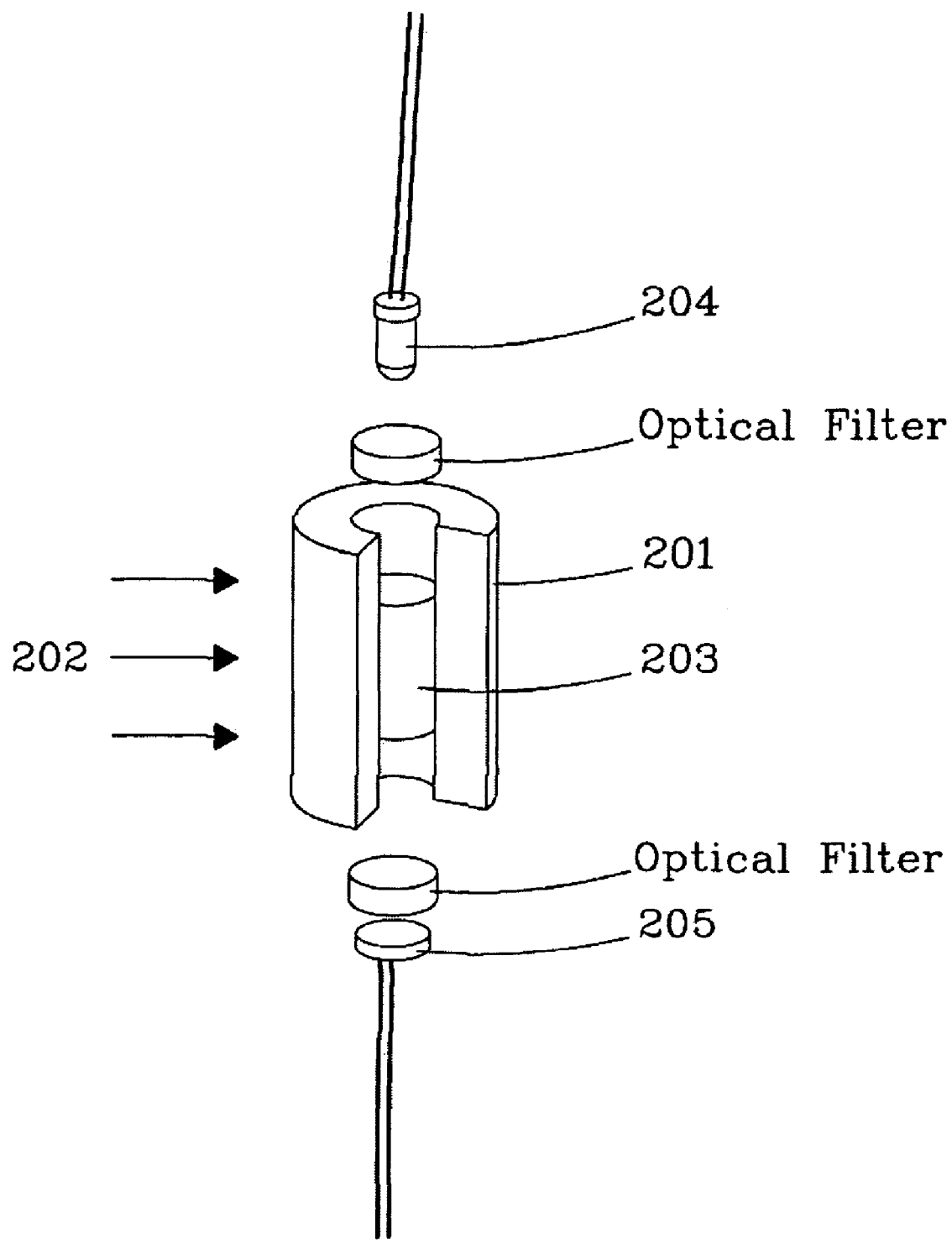
FIG. 2(a) is a schematic drawing showing a cut-away view of a cylindrically-shaped pixel.
Figure 2B:
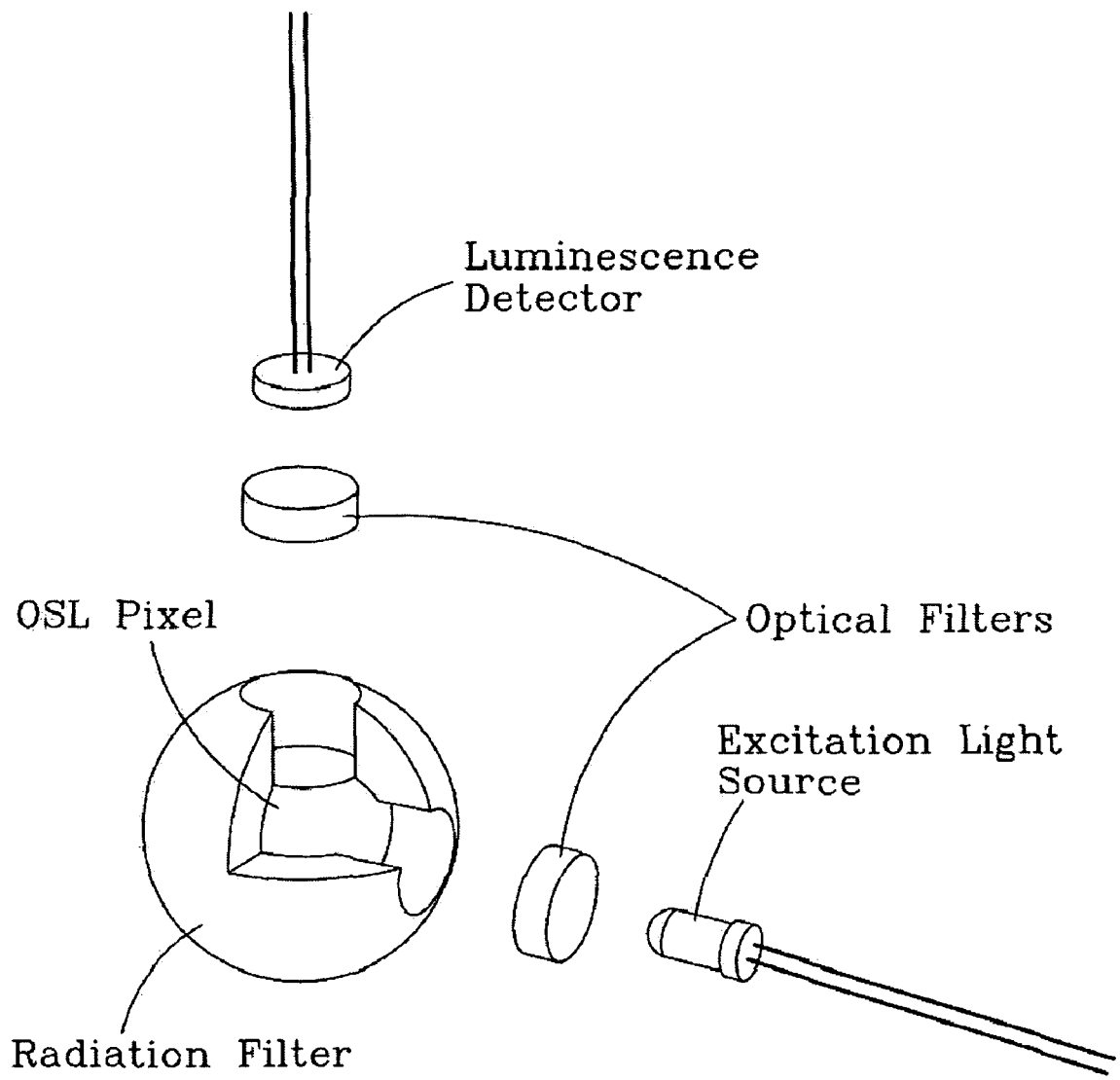
FIG. 2(b) is a schematic drawing showing a cut-away view of a spherically-shaped pixel.

In one embodiment of the invention, referring to FIG. 2a, the OSL pixel 203 is cylindrical and the radiation filter comprises an open-ended radiation filter "sheath" 201. Incident radiation 202 can impinge the pixel 203 normal to the longitudinal axis of the cylinder. Readout of the OSL pixel would involve illuminating the end of the pixel with the excitation light source 204 that is essentially parallel to the longitudinal axis of the pixel. The luminescence detector 205 would then detect the resultant OSL emission from the opposite end. In another embodiment, the OSL pixel and radiation filter are spherical, as shown in FIG. 2b.

Ionizing radiation that impinges an OSL pixel can generate trapped charge carriers in the OSL material. In some OSL materials, the trapped charge carriers can have lifetimes measurable on geologic time scales. Thus, appropriately-selected OSL materials can exhibit a "memory" of incident radiation events. This memory enables intermittent readout while the sensor is in the field. Stimulation by the light source depopulates the trapped charge carriers, which can result in the emission of a characteristic luminescence photon. Light sources can include, but are not limited to flash lamps, light emitting diodes (LED), arc lamps, and lasers and can be continuous-wave or pulsed. The appropriate wavelength for depopulating the trapped charges can depend on the particular OSL material and can be determined by measuring the OSL emission spectra and then finding the optimal excitation wavelengths that maximize the OSL. A preferred technique can comprise measuring the OSL emission peak while scanning across a wide band of excitation wavelengths until the optimal wavelengths are found. Alternatively, the open literature can be used to determine the best excitation and emission wavelengths for known OSL materials.

The use of pulsed light can be preferred because it can minimize the generation of heat often associated with continuous-wave sources, thereby eliminating the need for heat sinks and minimizing competing thermoluminescent emissions from the OSL material. Pulsed light sources can also allow for less stringent optical filtering as well as self-calibration. If the OSL output is measured between pulses after the excitation light has died away, then less optical filtering is required compared to measuring the OSL signal simultaneously with the excitation light. A self-calibration procedure can be performed internally by comparing the detected light signal with one or more of the excitation pulses to ensure that the signal resulting from the combination of the light source and the photodetector is within acceptable tolerances. If the light source becomes too intense or too weak, or if the photodetector becomes faulty, the resulting signal will change over time and this self-calibration procedure can reveal the problem.

The ability to average multiple luminescence counts resulting from a plurality of excitation pulses can provide a criterion for rejecting scintillation events. Specifically, a probability distribution on the mean luminescence response for each excitation pulse can be averaged over multiple pulses to discriminate against scintillation events. Thus, readout measurements can comprise a luminescence response from a single stimulation pulse or an averaged luminescence response from a plurality of stimulation pulses.

Figure 3:
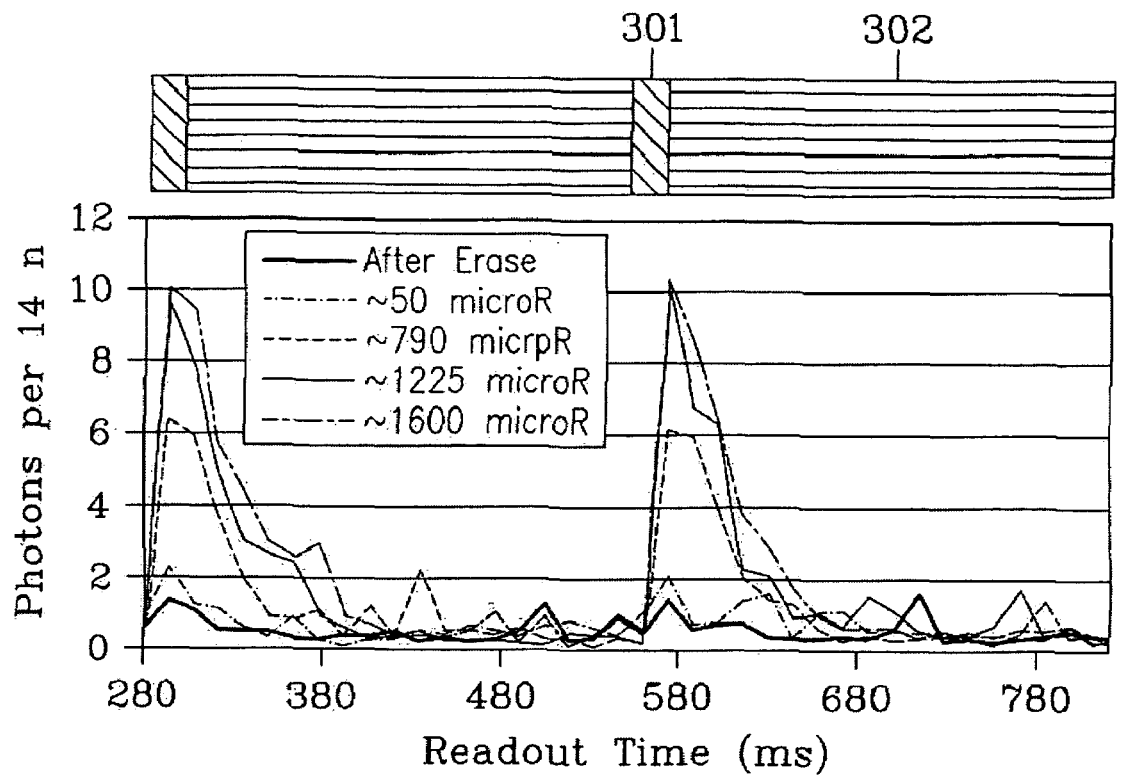
FIG. 3 is a plot of the luminescence emission after stimulation by an excitation light source.

In one example of the compact sensor, referring to FIG. 3, pulses of green light at approximately 530 nm±30 nm, stimulated the OSL pixel, which subsequently resulted in the emission of blue light at approximately 420 nm±30 nm. The plot shows the luminescence responses from OSL pixels that had previously received a variety of gamma-ray exposures ranging from approximately 50 microR to 1600 microR, though the present invention is not limited to these particular values. The pulse duration 301 was approximately 5 msec and the elapsed time between pulses 302 was approximately 280 msec. The OSL material had a decay constant of roughly 30 msec.

In preferred embodiments, the compact sensor would utilize OSL pixels having very short decay constants such as BaFBr-based materials, which can have decay constants of approximately 800 nanoseconds. OSL materials with very short decay constants can reduce the need for high-sensitivity detectors by optimizing the signal to noise ratio of the detected luminescence. Regardless of which OSL material is used, the invention can employ pulse separation times ranging from a value approximately greater than, or equal to, the decay constant to a value approximately less than, or equal to, 10 times the decay constant.

While the luminescence detector can comprise several types of photodetectors such as photomultiplier-tube (PMT) photosensors and charge-coupled devices (CCD), photodiodes can be preferred based on current costs and availability. A non-limiting example of a compact, photodiode-based radiation sensor can include a single yellow LED, a BaFBr-based OSL pixel, and a Si photodiode. After exposure to ionizing radiation and the creation of trapped charges, the OSL pixel can be excited by the yellow light at approximately 590 nm and will subsequently emit blue luminescence photons at approximately 390 nm±40 nm, which can be detected by the Si photodiode.

The compact sensor encompassed by the present invention can further comprise a wireless communication device operably connected to the light source, the luminescence detector, and the power source. The wireless communication device can communicate from the field instances of ionizing radiation detected by the sensor. Communication modes can include radio frequency (RF), microwave, infrared (IR), and more. One version of the wireless communication device can comprise processors, or logic components, operably connected to an RF antenna. The processors, or logic components, manage the data and the communication signals while the RF antenna receives and transmits sensor commands and radiation data.

In addition to communicating sensor radiation data, the wireless communication device can receive commands associated with regulation of the sensor's power consumption. For example, the compact sensor can have at least two power consumption modes. A first mode would draw only enough power to maintain a communication link so that the sensor can receive particular commands such as a wireless "activation" signal. In the first mode, the light source and the luminescence detector would be deactivated and would not draw power. However, incidents of ionizing radiation would still create trapped charges, which would be retained in the OSL material until depopulated by optical stimulation.

Upon receiving the activation signal, the sensor would "wake up" and enter a second mode in which the light source, the luminescence detector and the wireless communication device would be fully active. In this active state, the sensor would perform readouts of the OSL pixel and transmit the associated data, which would include the amount of radiation exposure received by the sensor. A subsequent wireless "hibernation" signal would then initiate a return to the first mode to preserve power.

Additional power consumption modes may exist for purposes of transmitting sensor location, performing state-of-health checks, and "erasing" the trapped charges in the OSL pixel. Alternatively, mode switching can be initiated based on predetermined values of elapsed time. For example, the sensor may perform intermittent readouts every 24 hours for five minutes each time. Device wake up methods and apparatus have been described in detail in U.S. patent application Ser. No. 10/263,940, titled "Radio Frequency Identification Devices, Backscatter Communication Device Wake-up Methods, Communication Device Wake-up Methods, and a Radio Frequency Identification Device Wake-up Method" by inventors Richard M. Pratt and Mike Hughes, which detailed descriptions are incorporated herein by reference. Attention is also directed to the following commonly assigned applications, which details regarding wireless communication devices and methods are incorporated herein by reference:

U.S. patent application Ser. No. 10/263,826 entitled "Radio Frequency Identification Device Communication Systems, Wireless Communication Devices, Backscatter Communication Methods and Radio Frequency Identification Device Communication Methods" by inventors Mike A. Hughes and Richard M. Pratt; U.S. patent application Ser. No. 10/263,809, entitled "Method of Simultaneously Reading Multiple Radio Frequency Tags, RF Tag, and RF Reader", by inventors Emre Ertin, Richard M. Pratt, Mike A. Hughes, Kevin L. Priddy, and Wayne M. Lechelt; U.S. patent application Ser. No. 10/263,873, entitled "RFID System and Method Including Tag ID Compression", by inventors Richard M. Pratt and Mike A. Hughes; U.S. patent application Ser. No. 10/264,078, entitled "System and Method to Identify Multiple RFID Tags", by inventors Mike A. Hughes and Richard M. Pratt; U.S. patent application Ser. No. 10/263,997, entitled "Wireless Communication Systems, Radio Frequency Identification Devices, Methods of Enhancing a Communications Range of a Radio Identification Frequency Device, and Wireless Communication Methods", by inventors Richard Pratt and Steven B. Thompson; U.S. patent application Ser. No. 10/263670, entitled "Wireless Communications Devices, Methods of Processing a Wireless Communication Signal, Wireless Communication Synchronization Methods and a Radio Frequency Identification Device Communication Method", by inventors Richard M. Pratt and Steven B. Thompson; U.S. patent application Ser. No. 10/263,656, entitled "Wireless Communications Systems, Radio Frequency Identification Devices, Wireless Communications Methods, and Radio Frequency Identification Device Communications Methods", by inventors Richard Pratt and Steven B. Thompson; U.S. patent application Ser. No. 10/263,635, entitled "A Challenged-Based Tag Authentication Model", by inventors Mike A. Hughes and Richard M. Pratt; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System"; by inventors R. W. Gilbert, G. A. Anderson, and K. D. Steele; U.S. patent application Ser. No. 09/833,465, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W. Gilbert and C. L. Carrender; U.S. patent application Ser. No. 09/589,000, filed Jun. 6, 2000, entitled "Multi-Frequency Communication System and Method", by inventors R. W. Gilbert and C. L. Carrender; U.S. patent application Ser. No. 09/588,998; filed Jun. 6, 2000, entitled "Distance/Ranging by Determination of RF Phase Delta", by inventor C. L. Carrender; U.S. patent application Ser. No. 09/797,539, filed Feb. 28, 2001, entitled "Antenna Matching Circuit", by inventor C. L. Carrender; U.S. patent application Ser. No. 09/833,391, filed Apr. 11, 2001, entitled "Frequency Hopping RFID Reader", by inventor C. L. Carrender.

The power source supplies the electrical power required by the compact sensor, including the light source and the luminescence detector during active readout as well as the wireless communication device. Examples of suitable power sources can include, among others, batteries, fuel cells, solar cells, and combinations thereof.

The present invention can also encompass a compact spectrometer comprising a plurality of OSL pixels and at least one radiation filter surrounding a portion of the OSL pixels. Each of the various OSL materials and radiation filters can serve to detect and modulate a particular energy range of the incident radiation flux, respectively. Collectively, the array of pixels not only detects the presence of ionizing radiation, but it can also collect spectroscopic information, which can be extracted from the relative luminescence signal of each pixel to produce an incident energy spectrum.

The plurality of OSL pixels can form an array in which the pixels comprise at least one OSL material. While many OSL materials may provide acceptable performance, those having decay constants less than or equal to approximately 100 msec are preferred. The OSL material can comprise $Al_2O_3$, Pb-loaded $Al_2O_3$, BaFBr, etc., and combinations thereof. The invention also encompasses doped $Al_2O_3$ and BaFBr materials including, but not limited to $Al_2O_3$:C and BaFBr:Eu. The pixels can also comprise a variety of shapes, for example, planar, cylindrical, spherical, or combinations thereof.

The radiation filters can comprise attenuating materials of differing compositions, shapes, and thicknesses. The materials can include, but are not limited to metals, alloys, ceramics, glasses, polymers, minerals, and combinations thereof. Specific metals include, but are not limited to Pb, W, Al, and combinations thereof. The shape of the radiation filter can be planar, cylindrical, spherical, or combinations thereof and can vary in thickness for different pixels in the OSL array. For neutron detection, the spectrometer can further comprise a neutron converting material that surrounds the OSL pixel. The neutron converting material can comprise $^{10}B$, $^{6}Li$, Gd, Sm, or combinations thereof.

Figure 4A:
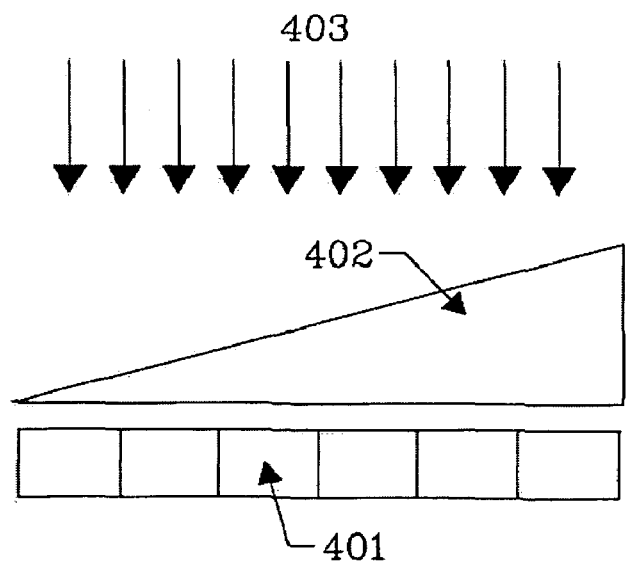
FIG. 4(a) is a drawing of a "wedge-shaped" radiation filter and an OSL array.
Figure 4B:
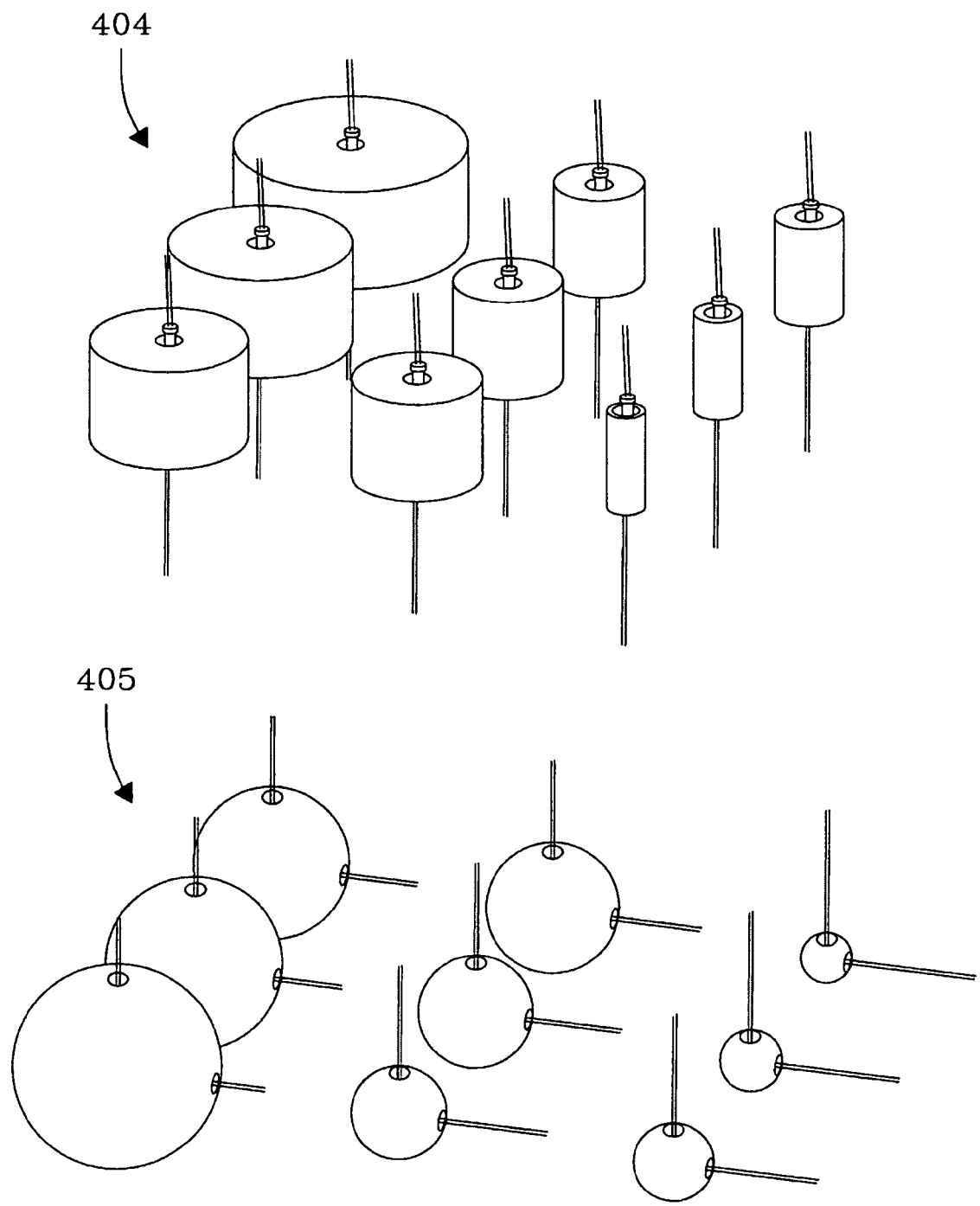
FIG. 4(b) is a drawing of arrays comprising spherically-shaped and cylindrically-shaped OSL pixels.

FIG. 4a depicts a simple, passive spectrometer having an OSL array 401 and a radiation filter 402 and illustrates the modulation of an incident radiation flux 403. The planar OSL pixels are partially encompassed by a "wedge-shaped" filter. For ionizing radiation that is normal to the surface of the OSL array, the radiation filter attenuates the energy of the incident radiation according to the thickness of the graded filter. Pixels in the portion of the array covered by relatively thin sections of the radiation filter will experience a greater exposure to the radiation flux compared to pixels covered by thicker portions of the filter. An example of such filters includes, but is not limited to a Pb filter having a thickness ranging from approximately 1 mm to 10 mm across at least one dimension of the filter. The OSL pixels can include, but are not limited to $Al_2O_3$ or Pb-loaded $Al_2O_3$ having a density of approximately 1.9 g/cm$^3$ or 2.4 g/cm$^3$, respectively, and having either a constant pixel thickness or an increasing thickness from approximately 1 to 20 mm across 10 pixels. In a preferred embodiment, referring to FIG. 4b, the pixels and filters composing the array are cylindrically 404 or spherically 405 shaped to minimize the angular dependence of the attenuation length through the filters.

The compact spectrometer encompassed by present invention can be passive, requiring no power, or it can be semi-active, requiring minimal power until activated. In the ultra-low power consumption, or semi-active, embodiment, the compact spectrometer can comprise at least the same components and can function in essentially the same manner as the compact sensor described above with the added capability of acquiring spectroscopic information. In the passive embodiment, OSL-pixel readout occurs after data collection, for instance, in a laboratory facility. Thus, the passive spectrometer comprising a plurality of OSL pixels and at least one radiation filter can be deployed for radiation monitoring, retrieved after a period of time and analyzed in a laboratory, where a trained technician extracts an incident energy spectrum according to the method described below.

While applicable to general, long-term radiation monitoring, the passive spectrometer is particularly suited for detection and spectroscopy in high-radiation applications, including those that might damage conventional electronics. Examples of such applications include, but are not limited to waste tanks, power plants, radiation hot cells, and downhole monitoring.

Relative to the passive spectrometer, the compact, semi-active spectrometer can further comprise at least one light source, at least one luminescence detector, a wireless communication device, and a power source. As described earlier for the compact sensor, readout of the spectrometer pixels involves illuminating the OSL material and detecting the subsequent optical luminescence. Readout of the array in the compact spectrometer can use one or more light sources and detectors; each electrically connected to the power source and operably connected to the wireless transmission device. Optical elements such as lenses, mirrors, filters, prisms, gratings, apertures and masks can be used to tune and direct the excitation light or the luminescence to portions of the array or the detector, respectively.

The semi-active spectrometer can further comprise a processor, an analog-to-digital converter, and low-noise pulse processing components each operably connected to the power source, the light sources, the detectors, and the wireless communication device. These additional components can serve to process and manage the hardware components, the data, and the power consumption in a similar manner the one described for the compact sensor. The processor can further serve to reconstruct the incident-energy spectrum according to the method described below, which the present invention also encompasses.

The method provides for the extraction of spectroscopic information from a compact spectrometer comprising a plurality of OSL pixels and at least one radiation filter surrounding at least a portion of the OSL pixels. The steps comprise: 1) providing a compact spectrometer of the present invention that has been exposed to an incident radiation flux, 2) optically stimulating the OSL pixels, 3) detecting the resultant luminescence, and 4) reconstructing an incident-energy spectrum from the detected luminescence.

Reconstruction of the spectrum can involve solving for s, the incident energy vector, in the following equation:

$$s=H^{-1}*d$$

where d is a vector of the mean energy deposited on each OSL pixel and H is a system matrix describing the probability of an incident gamma-ray or neutron being absorbed by the OSL material without colliding and interacting with the attenuation filter. The system matrix can be created by simulating or measuring the modulation of the incident radiation flux by the filter materials. Non-limiting examples of techniques for solving the equation above include direct, ordinary least squares, non-negative least squares, and maximum likelihood. Reconstruction of the spectrum may also comprise analytically solving for the inversion of the system matrix.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A compact spectrometer comprising:
   a plurality of OSL pixels; and
   at least one radiation filter for modulating an incident ionizing radiation flux, said radiation filter surrounding at least a portion of said OSL pixels;
   wherein said compact spectrometer acquires spectroscopic information regarding said incident ionizing radiation flux.

2. The compact spectrometer as recited in claim 1, wherein said plurality of OSL pixels is configured in an OSL array.

3. The compact spectrometer as recited in claim 1, wherein said plurality of OSL pixels comprises at least one OSL material.

4. The compact spectrometer as recited in claim 3, wherein said OSL material has a decay constant less than or equal to approximately 100 msec.

5. The compact spectrometer as recited in claim 3, wherein said OSL material is selected from the group consisting of $Al_2O_3$, doped $Al_2O_3$, Pb-loaded $Al_2O_3$, BaFBr, doped BaFBr, and combinations thereof.

6. The compact spectrometer as recited in claim 5, wherein said doped $Al_2O_3$ comprises C-doped $Al_2O_3$.

7. The compact spectrometer as recited in claim 5, wherein said doped BaFBr comprises Eu-doped BaFBr.

8. The compact spectrometer as recited in claim 1, wherein said OSL pixels have a shape selected from the group consisting of planar, cylindrical, spherical, and combinations thereof.

9. The compact spectrometer as recited in claim 1, wherein said radiation filter comprises at least one attenuating material.

10. The compact spectrometer as recited in claim 9, wherein said attenuating material is selected from the group consisting of metals, alloys, ceramics, glasses, polymers, minerals, and combinations thereof.

11. The compact spectrometer as recited in claim 9, wherein said radiation filters comprise a material selected from the group consisting of Pb, W, Al, and combinations thereof.

12. The compact spectrometer as recited in claim 1, wherein said radiation filter comprises a plurality of thicknesses.

13. The compact spectrometer as recited in claim 12, wherein said plurality of thicknesses comprises a wedge-shaped filter.

14. The compact spectrometer as recited in claim 13, wherein said wedge-shaped filter ranges from approximately 1 mm to approximately 10 mm in thickness.

15. The compact spectrometer as recited in claim 1, wherein said radiation filters comprise at least one shape.

16. The compact spectrometer as recited in claim 15, wherein said shape is selected from the group consisting of planar, cylindrical, spherical, and combinations thereof.

17. The compact spectrometer as recited in claim 1, wherein said compact spectrometer is deployed in high-radiation environments.

18. The compact spectrometer as recited in claim 17, wherein said high-radiation environments are selected from the group consisting of waste tanks, power plants, radiation hot cells, down-hole monitoring, and combinations thereof.

19. The compact spectrometer as recited in claim 1, wherein said incident ionizing radiation comprises gamma-rays.

20. The compact spectrometer as recited in claim 1, further comprising a neutron-converting material.

21. The compact spectrometer as recited in claim 20, wherein said incident ionizing radiation comprises neutrons.

22. The compact spectrometer as recited in claim 20, wherein said neutron-converting material is selected from the group consisting of $^{10}B$, $^{6}Li$, Gd, Sm, and combinations thereof.

23. The compact spectrometer as recited in claim 1, wherein said compact spectrometer consumes zero power.

24. The compact spectrometer as recited in claim 23, wherein said spectroscopic information is extracted by post-radiation-exposure analysis.

25. The compact spectrometer as recited in claim 24, wherein said post-radiation-exposure analysis comprises optical stimulation of said OSL array, detection of a readout luminescence, and reconstruction of an incident energy spectrum from said readout luminescence.

26. The compact spectrometer as recited in claim 25, wherein said reconstruction is selected from the group of techniques consisting of direct, ordinary least squares, non-negative least squares, maximum likelihood, and combinations thereof.

27. The compact spectrometer as recited in claim 25, wherein said reconstruction further comprises analytically solving for a system transfer function.

28. The compact spectrometer as recited in claim 1, further comprising:
   at least one light source proximally located to said OSL pixels;
   at least one luminescence detector proximally located to said OSL pixels;
   a power source electrically connected to said light sources and said detector;
   a wireless communication device operably connected to said light sources, said detectors, and said power source; and
   wherein said compact spectrometer has at least a first and a second power consumption mode and is capable of long-term, spectroscopic radiation monitoring.

29. The compact spectrometer as recited in claim 28, further comprising an enclosure for housing said OSL pixels, said light source, said detector, said wireless communication device, and said power source.

30. The compact spectrometer as recited in claim 28, further comprising a processor for reconstructing an incident-energy spectrum, wherein said processor is operably connected to said light source, said detector, said power source, and said wireless communication device.

31. The compact spectrometer as recited in claim 28, further comprising an analog-to-digital converter.

32. The compact spectrometer as recited in claim 28, further comprising low-noise pulse processing components.

33. The compact spectrometer as recited in claim 28, further comprising first optical elements for tuning an interrogating emission from said light sources.

34. The compact spectrometer as recited in claim 33, wherein said first optical elements are selected from the group consisting of lenses, filters, prisms, gratings, mirrors, apertures, and combinations thereof.

35. The compact spectrometer as recited in claim 28, further comprising second optical elements for tuning readout emissions from said OSL pixels.

36. The compact spectrometer as recited in claim 35, wherein said second optical elements are selected from the group consisting of lenses, filters, prisms, gratings, mirrors, apertures, and combinations thereof.

37. The compact spectrometer as recited in claim 28, wherein said light source comprises a pulsed light source.

38. The compact spectrometer as recited in claim 37, wherein said pulsed light source is selected from a group consisting of LEDs, flashlamps, lasers, and combinations thereof.

39. The compact spectrometer as recited in claim 37, wherein a pulse having a duration of less than or equal to approximately 5 msec is applied by said pulsed light source.

40. The compact spectrometer as recited in claim 28, wherein a pulse separation time exists between each pulse.

41. The compact spectrometer as recited in claim 40, wherein said pulse separation time is greater than or equal to a decay constant characteristic of said OSL pixels.

42. The compact spectrometer as recited in claim 41, wherein said pulse separation time is less than or equal to approximately 10 times said decay constant of said OSL pixel.

43. The compact spectrometer as recited in claim 28, wherein a readout measurement comprises a luminescence response to a single pulse.

44. The compact spectrometer as recited in claim 28, wherein a readout measurement comprises a plurality of luminescence responses to a plurality of pulses.

45. The compact spectrometer as recited in claim 44, wherein an average of said plurality of luminescence responses comprises a criterion for discrimination against scintillation events.

46. The compact spectrometer as recited in claim 28, wherein a decay constant of said OSL pixels comprises a criterion for discrimination against scintillation events.

47. The compact spectrometer as recited in claim 28, wherein said detector is selected from the group consisting of photodiodes, CCDs, PMT photosensors, and combinations thereof.

48. The compact spectrometer as recited in claim 47, wherein said photodiodes are selected from the group consisting of avalanche, drift, and combinations thereof.

49. The compact spectrometer as recited in claim 28, wherein said power source is selected from the group consisting of batteries, fuel cells, solar cells, and combinations thereof.

50. The compact spectrometer as recited in claim 28, wherein said first power consumption mode draws power to maintain only a communication link.

51. The compact spectrometer as recited in claim 50, wherein said first power consumption mode comprises a default state of said compact sensor.

52. The compact spectrometer as recited in claim 28, wherein said second power consumption mode comprises an active state of said compact sensor.

53. The compact spectrometer as recited in claim 28, wherein a change in said power consumption mode is initiated by a wireless signal, an elapsed duration of time, or combinations thereof.

54. The compact spectrometer as recited in claim 53, wherein said wireless signal comprises an activation signal to initiate a change from said first to said second power consumption mode.

55. The compact spectrometer as recited in claim 53, wherein said wireless signal comprises a hibernation signal to initiate a change from said second to said first power consumption mode.

56. A compact spectrometer comprising:
a plurality of OSL pixels, wherein said OSL pixels are cylindrical, spherical, or combinations thereof; and
at least one radiation filter surrounding at least a portion of said OSL pixels for modulating an incident ionizing radiation flux;
wherein said compact spectrometer acquires spectroscopic information regarding said incident ionizing radiation flux.

57. A compact spectrometer comprising:
a plurality of OSL pixels;
at least one radiation filter surrounding at least a portion of said OSL pixels for modulating an incident ionizing radiation flux;
at least one light source proximally located to said OSL pixels;
at least one luminescence detector proximally located to said OSL pixels;
a power source electrically connected to said light sources and said detector;
a wireless communication device operably connected to said light sources, said detectors, and said power source; and
wherein said compact spectrometer acquires spectroscopic information regarding said incident ionizing radiation flux.

58. An apparatus comprising:
a container, and
a compact spectrometer comprising:
a plurality of OSL pixels; and
at least one radiation filter for modulating an incident ionizing radiation flux, said radiation filter surrounding at least a portion of said OSL pixels;
wherein said compact spectrometer acquires spectroscopic information regarding said incident ionizing radiation flux and is attached to said container.

59. A method for extracting spectroscopic information comprising the steps of:
providing a compact spectrometer comprising a plurality of OSL pixels and at least one radiation filter surrounding at least a portion of said OSL pixels, wherein said compact spectrometer has been exposed to an incident ionizing radiation flux;
optically stimulating said plurality of OSL pixels, resulting in a readout luminescence of deposited energy values;
detecting said readout luminescence, thereby obtaining a readout signal; and
reconstructing an incident-energy spectrum from said readout signal;
thereby extracting spectroscopic information regarding said incident ionizing radiation flux.

60. The method as recited in claim 59, wherein said compact spectrometer consumes zero power.

61. The method as recited in claim 59, wherein said incident ionizing radiation flux occurs during monitoring of high radiation environments.

62. The method as recited in claim 61, wherein said high radiation environments are selected from the group consisting of waste tanks, power plants, radiation hot cells, downhole monitoring, and combinations thereof.

63. The method as recited in claim 59, wherein said incident ionizing radiation flux is selected from the group consisting of neutrons, gamma rays, and combinations thereof.

64. The method as recited in claim 59, wherein said optically stimulating comprises a continuous wave light source.

65. The method as recited in claim 59, wherein said optically stimulating comprises a pulsed light source.

66. The method as recited in claim 65, wherein said pulsed light source is selected from the group consisting of light emitting diodes, flash lamps, lasers, and combinations thereof.

67. The method as recited in claim 59, wherein said plurality of OSL pixels comprise at least one OSL material.

68. The method as recited in claim 67, wherein said OSL material is selected from the group consisting of $Al_2O_3$, doped $Al_2O_3$, Pb-loaded $Al_2O_3$, Eu-doped BaFBr, and combinations thereof.

69. The method as recited in claim 59, wherein said OSL pixels have a shape selected from the group consisting of cubes, cylinders, spheres, and combinations thereof.

70. The method as recited in claim 59, wherein said detecting comprises using CCDs, PMT photosensors, photodiodes, and combinations thereof.

71. The method as recited in claim 70, wherein said plurality of thicknesses comprises a wedge-shaped filter.

72. The method as recited in claim 71, wherein said wedge-shaped filter is approximately 1 mm to 10 mm thick.

73. The method as recited in claim 59, wherein said radiation filter comprises a plurality of thicknesses.

74. The method as recited in claim 59, wherein said radiation filter is planar, cylindrical, spherical, or combinations thereof.

75. The method as recited in claim 59, wherein said radiation filter comprises at least one attenuating material.

76. The method as recited in claim 75, wherein said attenuating material is selected from the group consisting of metals, alloys, ceramics, glasses, polymers, minerals, and combinations thereof.

77. The method as recited in claim 76, wherein said attenuating material is selected from the group consisting of Pb, W, Al, and combinations thereof.

78. The method as recited in claim 59, wherein said reconstructing step is selected from the group of techniques consisting of direct, ordinary least squares, non-negative least squares, maximum likelihood, and combinations thereof.

79. The method as recited in claim 59, wherein said reconstructing step further comprises analytically solving for a system transfer function.

* * * * *